United States Patent
Marietta et al.

(10) Patent No.: US 7,849,247 B2
(45) Date of Patent: Dec. 7, 2010

(54) INTERRUPT CONTROLLER FOR ACCELERATED INTERRUPT HANDLING IN A DATA PROCESSING SYSTEM AND METHOD THEREOF

(75) Inventors: Bryan D. Marietta, Austin, TX (US); Michael D. Snyder, Cedar Park, TX (US); Gary L. Whisenhunt, Leander, TX (US); Daniel L. Bouvier, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 109 days.

(21) Appl. No.: 12/250,682

(22) Filed: Oct. 14, 2008

(65) Prior Publication Data

US 2010/0095039 A1   Apr. 15, 2010

(51) Int. Cl.
    *G06F 13/24* (2006.01)
(52) U.S. Cl. ...................... 710/264; 710/268
(58) Field of Classification Search .......... 710/260–269
     See application file for complete search history.

(56) References Cited

U.S. PATENT DOCUMENTS

| | | | | |
|---|---|---|---|---|
| 5,721,931 A | * | 2/1998 | Gephardt et al. | 710/260 |
| 5,765,195 A | * | 6/1998 | McDonald | 711/141 |
| 5,905,898 A | | 5/1999 | Qureshi et al. | |
| 5,968,159 A | * | 10/1999 | Mattheis | 710/264 |
| 6,263,397 B1 | | 7/2001 | Wu et al. | |
| 6,356,354 B1 | * | 3/2002 | Prenn et al. | 358/1.14 |
| 6,813,665 B2 | * | 11/2004 | Rankin et al. | 710/260 |
| 7,552,236 B2 | * | 6/2009 | Greenfield et al. | 709/238 |
| 7,685,347 B2 | * | 3/2010 | Gibbs | 710/264 |
| 2002/0073131 A1 | * | 6/2002 | Brenner et al. | 709/102 |
| 2002/0073262 A1 | | 6/2002 | Godfrey | |
| 2004/0236879 A1 | | 11/2004 | Croxford et al. | |
| 2008/0114916 A1 | * | 5/2008 | Hummel et al. | 710/266 |

FOREIGN PATENT DOCUMENTS

EP    0685798 B1    7/2003

OTHER PUBLICATIONS

Freescale Semiconductor, Inc. "CoreInt Architectural Specification 0.1.3" USA, 2005.
PCT Application No. PCT/US2009/054850; Search Report and Written Opinion dated Feb. 22, 2010.

\* cited by examiner

*Primary Examiner*—Raymond N Phan
(74) *Attorney, Agent, or Firm*—Susan C Hill; Joanna G. Chiu

(57) ABSTRACT

A data processing system has an interrupt controller which provides an interrupt request along with a corresponding interrupt identifier and a corresponding interrupt vector to a processor. If the processor accepts the interrupt, the processor returns the same interrupt identifier value by way of interrupt identifier, along with interrupt acknowledge, to the interrupt controller. An interrupt taken/not taken indicator may also be provided. The communications interface used to coordinate interrupt processing between the interrupt controller and the processor may be asynchronous.

18 Claims, 3 Drawing Sheets

INTERRUPT CONTROLLER FOR ACCELERATED INTERRUPT HANDLING IN A DATA PROCESSING SYSTEM AND METHOD THEREOF

BACKGROUND

1. Field

This disclosure relates generally to a data processing system, and more specifically, to a data processing system having interrupts.

2. Related Art

For some applications, it is important, and often crucial, to reduce the amount of time it takes a processor to respond to an important interrupt in a data processing system. As a result, processor interrupt response latency is critical to many real-time and near real-time applications.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
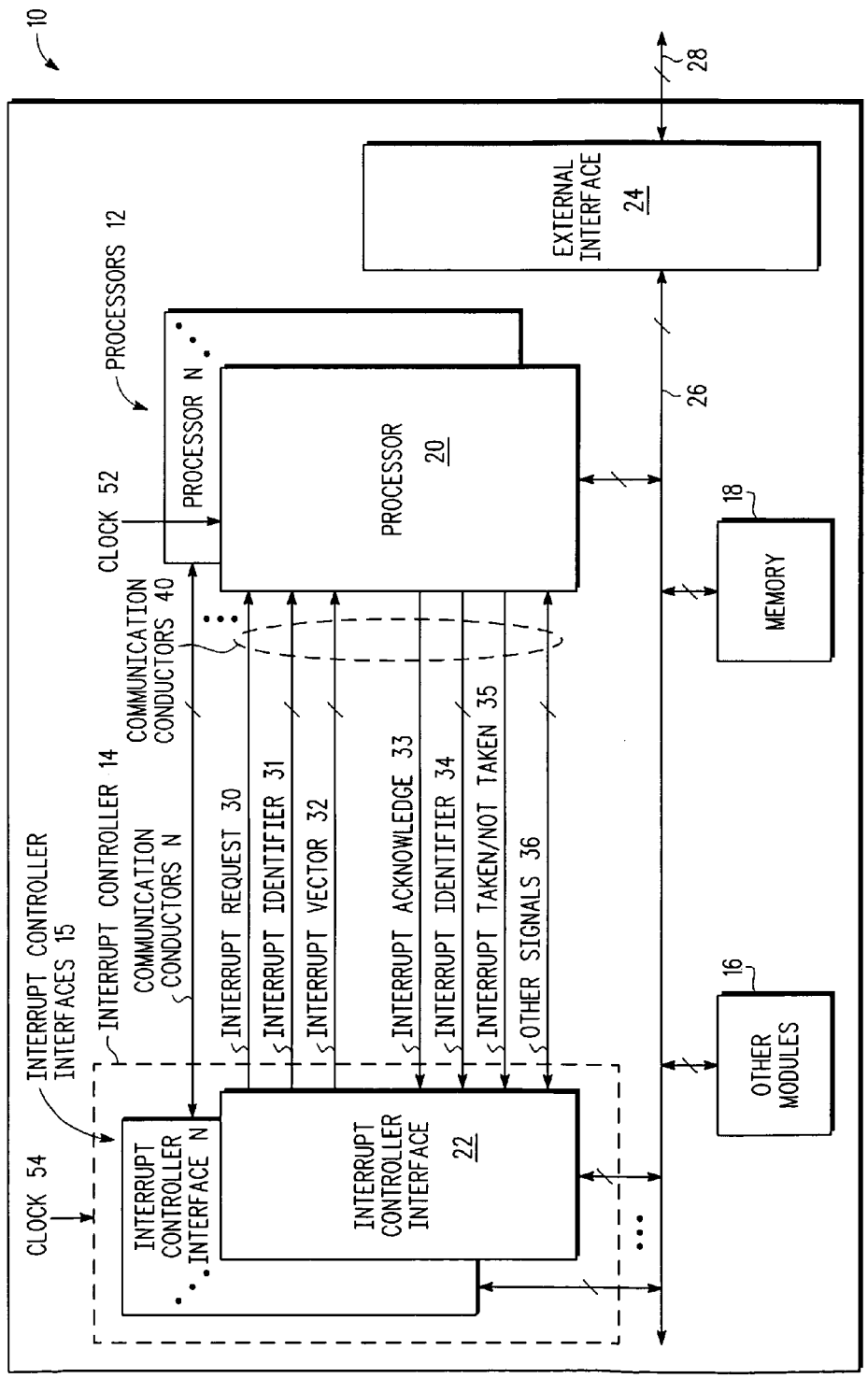
FIG. 1 illustrates, in block diagram form, a data processing system in accordance with one embodiment.

Processor interrupt response latency is critical to many real-time and near real-time applications. For many data processing systems, the interrupt fetch mechanism requires the processor to perform a guarded load from a memory mapped register. Unfortunately, for many systems, such a load may have substantial contention and thus substantial delay. For example, in a data processing system having multiple processors on a single integrated circuit, there may be a significant number of processors vying for access to the busses that are used to transfer the information between a processor and the memory mapped register in the interrupt controller. It would thus be useful to implement a mechanism to accelerate the handling of the interrupt vector and any other information required for interrupt processing.

In one embodiment, the interrupt vector is stored in the register space of an interrupt controller, and the register space of the interrupt controller is a shared resource that is coupled to a plurality of processors by way of a single serialized access path (e.g. per the Open Programmable Interrupt Controller (OpenPIC) standard). Thus obtaining the interrupt vector may be a very slow process due to the access contention on the single serialized access path. Alternate embodiments may use other interrupt controllers other than ones defined by OpenPIC, but may also have a problem with interrupt response latency.

In one embodiment, an interrupt controller 14 provides an interrupt request 30 along with a corresponding interrupt identifier 31 and a corresponding interrupt vector 32 to a processor 20. If the processor 20 accepts the interrupt, the processor 20 returns the same interrupt identifier 31 value by way of interrupt identifier 34, along with interrupt acknowledge 33, to the interrupt controller 14. By receiving the interrupt acknowledge 33, the interrupt controller 14 can determine that processor 20 has accepted an interrupt; and by receiving the interrupt identifier 34, the interrupt controller 14 can determine which interrupt has been accepted for servicing by processor 20. In an alternate embodiment, processor 20 may provide an interrupt taken/not taken indicator 35 in addition to an interrupt acknowledge 33 and an interrupt identifier 34. Note that for one embodiment, the communications (see interfaces 60 and 70) used to coordinate interrupt processing between the interrupt controller 14 and the processor 20 may be asynchronous. Alternate embodiments may use a synchronous interface between processor 20 and interrupt controller 14 for communicating interrupt processing information.

FIG. 1 illustrates, in block diagram form, a data processing system 10 in accordance with one embodiment. In one embodiment, data processing system 10 may be provided on a single integrated circuit. In alternate embodiments, data processing system 10 may be provided on a plurality of integrated circuits. In one embodiment, bus 26 is bi-directionally coupled to one or more processors 12, to interrupt controller 14, to one or more other modules 16, to one or more memories 18, and to external interface 24. In one embodiment, interrupt controller 14 has a plurality of N interrupt controller interfaces 15, each of which is individually bi-directionally coupled to bus 26. In an alternate embodiment, interrupt controller 14 has a plurality of N interrupt controller interfaces 15 which collectively share a single coupling to bus 26. In various embodiments, modules 16 may include any type of circuitry, such as, for example, timers, drivers, communication ports, etc. Similarly, in various embodiments, memory 18 may include any type of memory, such as, for example, random access memory, read only memory, various types of non-volatile memory, etc. In the illustrated embodiment, external interface 24 is coupled to data processing system 10 by way of one or more terminals or conductors 28. In one embodiment, one or more external interrupt sources may provide an interrupt signal to system 10 by way of terminals or conductors 28.

In one embodiment, a plurality of N processors 12 is coupled to an interrupt controller 14, and interrupt controller 14 has a plurality of N interrupt controller interfaces 15. In the illustrated embodiment, data processing system 10 has a plurality of N processors 12 (including processor 20), a plurality of N communication conductors (including communication conductors 40), and a plurality of N interrupt controller interfaces 15 (including interrupt controller interface 22). In one embodiment, each of the N interrupt controller interfaces 15 is coupled to a corresponding one of the processors 12 by way of one or more communication conductors (e.g. communication conductor 40). In one embodiment, the communication conductors (e.g. 40) used to couple each processor N (e.g. 20) and its corresponding interrupt controller interface N (e.g. 22) uses a duplicate set of the same conductors performing the same functions. In an alternate embodiment, some of the processors 12 may communicate with interrupt controller 14 in a different manner than by way of communication conductors 40. Note that N is an integer greater than or equal to one.

In one embodiment, communication conductors 40 include an interrupt request indicator 30, an interrupt identifier 31, and an interrupt vector 32 which are provided by the interrupt controller interface 22 to processor 20. In one embodiment, communication conductors 40 also include an interrupt acknowledge 33, an interrupt identifier 34, and an interrupt taken/not taken indicator 35. In some embodiments, communication conductors 40 also include one or more other signals 36 which may be bidirectional, which may be uni-directional from interrupt controller interface 22 to processor 20, or which may be uni-directional from processor 20 to interrupt controller interface 22. Note that for alternate embodiments, the information provided by conductors 30-32 may be provided by way of any one or more separate or shared conductors. Likewise, for alternate embodiments, the information provided by conductors 33-35 may be provided by way of any one or more separate or shared conductors.

In the illustrated embodiment, interrupt controller 14 receives a clock signal 54 that is used to clock the circuitry internal to interrupt controller 14. Similarly, in the illustrated embodiment, processor 20 receives a clock signal 52 that is used to clock the circuitry internal to processor 20. In one embodiment, the clock 54 used to clock the circuitry in interrupt controller 14 has an arbitrary phase and frequency relationship with clock 52 used to clock the circuitry in processor 20. In an alternate embodiment, there may be a known or predetermined relationship between clocks 52 and 54, and thus these clocks may not be asynchronous.

Figure 2:
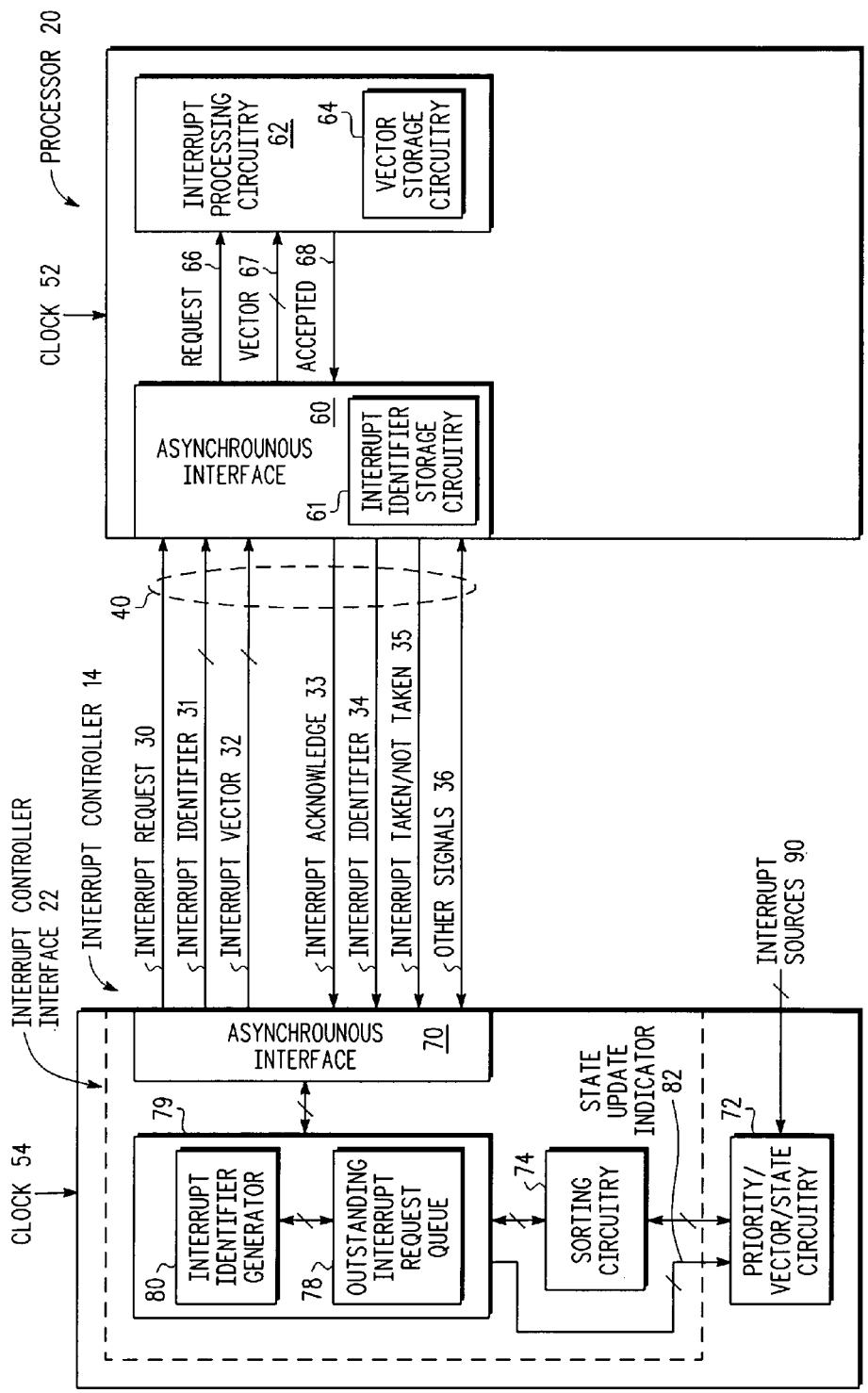
FIG. 2 illustrates, in block diagram form, a processor and interrupt controller of FIG. 1 in accordance with one embodiment.

FIG. 2 illustrates, in block diagram form, a processor 20 and interrupt controller 14 of FIG. 1 in accordance with one embodiment. In the illustrated embodiment, the same communication conductors 40 as described in FIG. 1 are used to communicate interrupt information between an asynchronous interface 70 of interrupt controller 14 and an asynchronous interface 60 of processor 20. In one embodiment, interfaces 60 and 70 are asynchronous because the clock 54 used to clock the circuitry in interrupt controller 14 is asynchronous to the clock 52 used to clock the circuitry in processor 20.

In one embodiment, interrupt controller 14 has priority/vector/state circuitry 72 and has an interrupt controller interface 22. In the illustrated embodiment, the priority/vector/state circuitry 72 receives one or more inputs from one or more interrupt sources 90. Each one of interrupt sources 90 may be provided from a source that is either internal to data processing system 10 or external to data processing system 10. In one embodiment, interrupt controller interface 22 includes sorting circuitry 74 that is bi-directionally coupled to priority/vector/state circuitry 72, and that is bi-directionally coupled to circuitry 79. In one embodiment, circuitry 79 includes an outstanding interrupt request queue 78 and includes interrupt identifier generator circuitry 80, which are bi-directionally coupled to each other. Circuitry 79 is also bi-directionally coupled to asynchronous interface 70. In one embodiment, circuitry 79 provides a state update indicator 82 to the priority/vector/state circuitry 72. In one embodiment, the state update indicator 82 is provided by way of one or more conductors.

Still referring to FIG. 2, in the illustrated embodiment, processor 20 includes interrupt processing circuitry 62 and asynchronous interface 60. In one embodiment, the asynchronous interface 60 provides an interrupt request 66 and an interrupt vector 67 to interrupt processing circuitry 62. Alternate embodiments may use any number of conductors 66, 67 to convey the interrupt request and interrupt vector information from asynchronous interface 60 to interrupt processing circuitry 62. In one embodiment, interrupt processing circuitry 62 provides an accepted indicator 68 to the asynchronous interface 60. Alternate embodiments may use any number of conductors 68 to convey the interrupt accepted information from the interrupt processing circuitry 62 to the asynchronous interface 60. Note that some embodiments may even use the same conductors that provide the request 66 and vector 67 information to also return the accepted 68 information. In one embodiment, the interrupt processing circuitry 62 has vector storage circuitry 64 for storing the interrupt vector 32 provided by way of conductors 40. In one embodiment, the asynchronous interface 60 has interrupt identifier storage circuitry 61 for storing the interrupt identifier 31 provided by way of conductors 40. In alternate embodiments, processor 20 may store the interrupt vector 32 and the interrupt identifier 31 in a different manner and/or in a different location.

Figure 3:
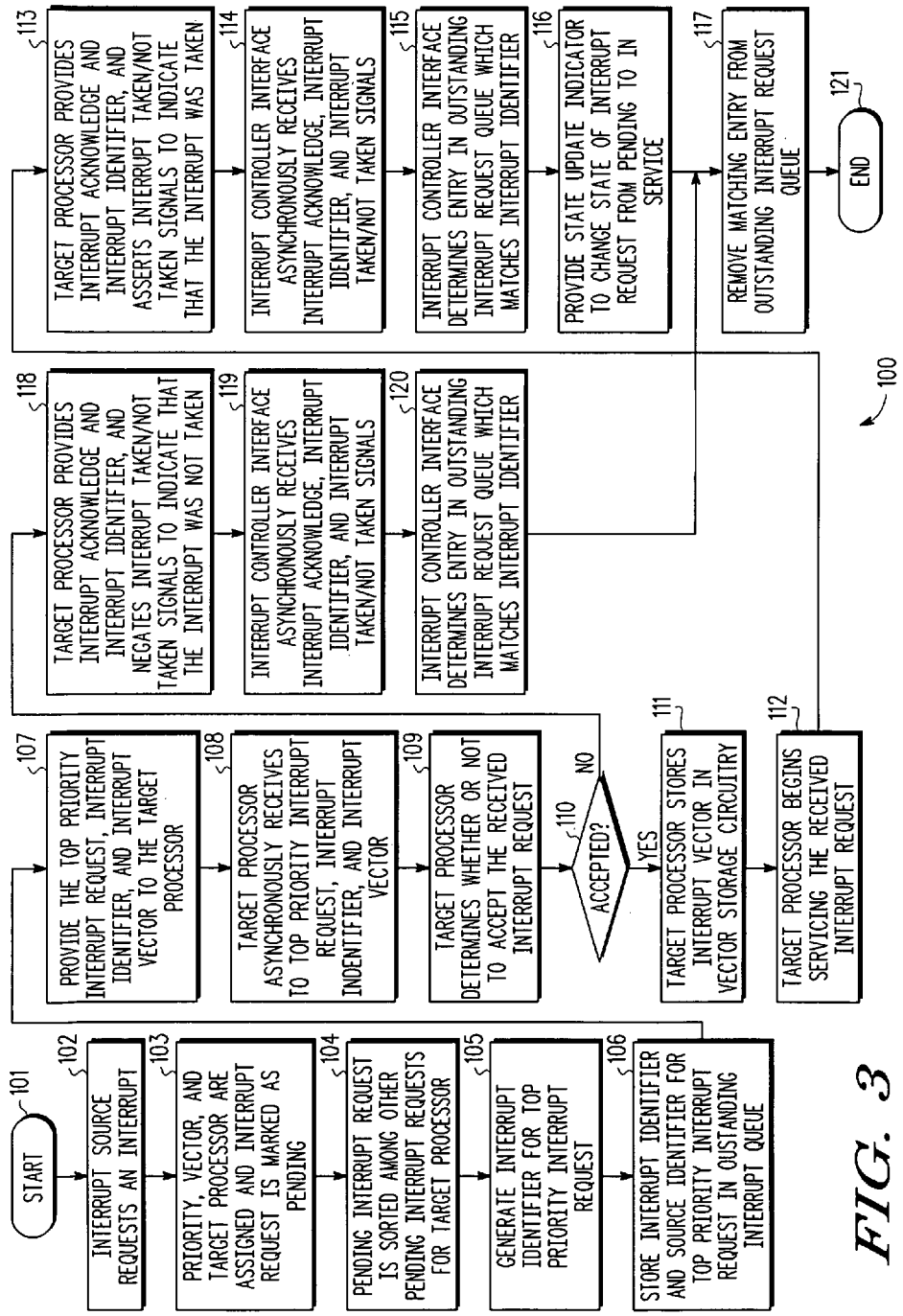
FIG. 3 illustrates, in flow diagram form, a method for acknowledging an interrupt in accordance with one embodiment.

FIG. 3 illustrates, in flow diagram form from start oval 101 to end oval 121, a method 100 for acknowledging an interrupt in accordance with one embodiment. Various embodiments of method 100 will be described herein below as the operation of the circuitry illustrated in FIGS. 1 and 2 is described.

The operation of the circuitry illustrated in FIGS. 1 and 2 and a method 100 illustrated in FIG. 3 will now be described in more detail. In the illustrated embodiment, one or more interrupt sources 90 are coupled to an interrupt controller 14. Note that for various embodiments, the interrupt sources 90 may be internal or external to data processing system 10. For example, in a real-time control application, some examples of external interrupt sources 90 may be a switch or a keypad key via external interface 24, and some examples of internal interrupt sources 90 may be interrupts from other modules 16, such as an interrupt from a timer or from a communication port (see FIG. 1).

When an interrupt is received by interrupt controller 14 (see box 102 in FIG. 3), the priority/vector/state circuitry 72 determines a priority, a vector, an interrupt source identifier, and any other associated state information (e.g. which processor is the target processor for that particular interrupt source 90) (see box 103 in FIG. 3). Note that for one embodiment, circuitry 72 is programmable to allow different applications using system 10 to customize the response to various interrupt sources. In one embodiment, each interrupt source 90 may be configured to have a corresponding priority, vector, and target processor. Note that various interrupt sources 90 may share a same priority, vector, and/or target processor; however, the interrupt source identifier may be unique for each interrupt source 90. The term "target processor" is being used to indicate the processor that is intended to service the interrupt. In one embodiment, the state information also includes one or more indicators to indicate various states of the interrupt (e.g. pending, in service, invalid, etc.). In one embodiment, circuitry 72 determines which processor is the target processor and selectively provides the interrupt request to the sorting circuitry 74 for that target processor. In an alternate embodiment, circuitry 72 provides the interrupt request to the sorting circuitry 74 for all processors, and each sorting circuitry 74 determines whether that particular interrupt corresponds to its target processor.

In one embodiment, when an interrupt from an interrupt source 90 is first received by the interrupt controller 14, the initial state of the interrupt is marked as "pending" (see box 103 in FIG. 3). In one embodiment, sorting circuitry 74 sorts the interrupt request among other pending interrupt requests for that particular target processor (see box 104 in FIG. 3). Alternate embodiments may sort the interrupt requests in any desired and appropriate manner. For example, in one embodiment, the interrupt requests may be sorted by way of priority, age, interrupt type, or any combination thereof. As a result of the sorting, there is one interrupt request that is designated as the top or next interrupt request (see box 105 in FIG. 3). Once a top interrupt request has been determined, an interrupt identifier corresponding to that particular interrupt is generated (see box 105 in FIG. 3 and interrupt identifier generator 80 in FIG. 2). Alternate embodiments may generate the interrupt identifier in any desired and appropriate manner. In one embodiment, the interrupt identifier can be any value that is unique to that particular interrupt request. Once the interrupt associated with a corresponding interrupt identifier has been serviced, the value of that interrupt identifier can be used again for a new and completely unrelated interrupt, if desired. The value of the interrupt identifier may have a particular significance (e.g. interrupt source number, etc.) or may be unrelated to the interrupt itself. However, in one embodiment, each interrupt request has a correspondence interrupt identifier. In one embodiment, interrupt identifier generator 80 provides the interrupt identifier to the outstanding interrupt request queue 78 to be stored along with the interrupt source identifier (see box 106 in FIG. 3).

Note that in the illustrated embodiment, the asynchronous interface 70 in the interrupt controller 14 is asynchronous from the asynchronous interface 60 in processor 20. In one embodiment, the clock 54 used to clock the circuitry in interrupt controller 14 has an arbitrary phase and frequency relationship with clock 52 used to clock the circuitry in processor 20. Note that the fact that the interfaces between the interrupt controller 14 and the processor 12 are asynchronous requires that all communication work in an event based manner rather than a time based manner. This increases the complexity of the interface and makes it more difficult to quickly and adequately communicate the required information.

In one embodiment, the interrupt controller 14 provides the top priority interrupt request 30, the interrupt identifier 31, and interrupt vector 32 to processor 20 (see boxes 107 and 108 in FIG. 3). Alternate embodiments may provide this information using any desired and appropriate signals (e.g. some of this information may be provided serially, in parallel, may be time multiplexed, etc.) What is important is that this interrupt information is provided and received in a coordinated manner between multiple blocks of circuitry (e.g. 14, 12) that are operating asynchronously. Once an interrupt request is received by processor 20, processor 20 determines whether or not to accept the received interrupt request (see box 108 and 109 in FIG. 3). Alternate embodiments may use different criteria to determine whether or not to accept the received interrupt request. For example, in one embodiment, software and/or hardware masking of interrupts may be used in processor 20. In an alternate embodiment, the decision to accept or reject an interrupt may be deferred until there is a change in one or more mask values to allow acceptance of the interrupt, or until a new interrupt request is received. If an original interrupt request has not yet been accepted when a new interrupt request is received by processor 20, then processor 20 will reject the original interrupt request in favor of the new interrupt request. Note that the only way a new interrupt request will even be sent to processor 20 is if that new interrupt request was determined by sorting circuitry 74 to be of higher priority. Alternate embodiments of processor 20 may use any desired and appropriate criteria for determining whether or not to accept the received interrupt request.

If the interrupt received by processor 20 is accepted (see decision diamond 110 in FIG. 3), then processor 20 stores the interrupt vector (provided via 32 and 67) into vector storage circuitry 64 (see box 111 in FIG. 3) and begins servicing the interrupt request (see box 112 in FIG. 3). In one embodiment, the servicing of an interrupt request may be performed in any desired and appropriate manner, including any known prior art manner.

In one embodiment, processor 20 provides an interrupt acknowledge 33 and an interrupt identifier 34, and asserts an interrupt taken/not taken indicator 35 to interrupt controller 14 to indicate that the interrupt was taken (see box 113 in FIG. 3). The interrupt controller 14 asynchronously receives the interrupt acknowledge 33, the interrupt identifier 34, and the asserted interrupt taken/not taken indicator (see box 114 of FIG. 3). In one embodiment, the interrupt controller 14 uses the interrupt identifier 31 to select a corresponding entry in the outstanding interrupt request queue 78 (see box 115 in FIG. 3). In one embodiment, the interrupt source identifier from the corresponding entry is used by circuitry 79 to provide state update indicator 82 to circuitry 72 to change the state of the interrupt request from pending to in-service in circuitry 72 (see box 116 in FIG. 3). In addition, circuitry 79 removes the matching entry from the outstanding interrupt request queue 78 (see box 117 in FIG. 3). At this point, the interrupt has been delivered to processor 20 with its corresponding interrupt vector, processor 20 is servicing the interrupt, and the interrupt is now in the "in-service" state in the interrupt controller 14. Note that for one embodiment, no software intervention was required in order to perform the steps described in FIG. 3.

In an alternate embodiment, an interrupt taken/not taken indicator 35 may not be used. For this embodiment, the interrupt acknowledge 33 and corresponding interrupt identifier 34 is only provided when an interrupt is taken by processor 20. In addition, for this embodiment, when the interrupt controller receives an interrupt acknowledge 33 and its corresponding interrupt identifier 34, circuitry 79 treats all older interrupt requests as not taken and removes them from the outstanding interrupt request queue 78.

Returning to decision diamond 110 (see FIG. 3), if the interrupt received by processor 20 is not accepted, processor 20 provides an interrupt acknowledge 33 and an interrupt identifier 34, and negates an interrupt taken/not taken indicator 35 to interrupt controller 14 to indicate that the interrupt was not taken (see box 118 in FIG. 3). The interrupt controller 14 asynchronously receives the interrupt acknowledge 33, the interrupt identifier 34, and the asserted interrupt taken/not taken indicator (see box 119 of FIG. 3). In one embodiment, the interrupt controller 14 uses the interrupt identifier 31 to select a corresponding entry in the outstanding interrupt request queue 78 (see box 120 in FIG. 3). Circuitry 79 removes the matching entry from the outstanding interrupt request queue 78 (see box 117 in FIG. 3). At this point, the interrupt has been delivered to processor 20 with its corresponding interrupt vector, processor 20 is not servicing the interrupt, and the interrupt is remains in the "pending" state in the interrupt controller 14 and can again be selected by sorting circuitry 74 to be presented to the processor via 30-32.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 18 may be located on a same integrated circuit as processors 12 or on a separate integrated circuit or located within another peripheral or slave discretely separate from other elements of system 10. Other modules 16 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, different circuitry may be used to implement interrupt controller 14, and any desired and appropriate number of conductors may be used for communication conductors 40. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling. In various embodiments, all or any portion or portions of the circuitry illustrated in the figures may be provided in any desired and appropriate manner.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text

1. A data processing system for example (10) comprising:
    a processor for example (20); and
    an interrupt controller for example (14) coupled to the processor, wherein the interrupt controller provides an interrupt request for example (30), an interrupt identifier for example (31) corresponding to the interrupt request, and an interrupt vector for example (32) corresponding to the interrupt request to the processor, and wherein the processor, upon accepting the interrupt request, provides to the interrupt controller an interrupt acknowledge for example (33) corresponding to the interrupt request and the interrupt identifier for example (31) corresponding to the interrupt request.
2. The data processing system of statement 1 or any other appropriate statement herein, wherein the interrupt controller is coupled to the processor via an asynchronous interface for example (70), and wherein the interrupt request, interrupt identifier, interrupt vector, and interrupt acknowledge are provided via the asynchronous interface.
3. The data processing system of statement 1 or any other appropriate statement herein, wherein the processor, upon accepting the interrupt request, also asserts an interrupt taken/not taken indicator for example (35) to indicate that the interrupt request was accepted by the processor, wherein the interrupt taken/not taken indicator is provided from the processor to the interrupt controller.

4. The data processing system of statement 3 or any other appropriate statement herein, wherein the processor, upon not accepting the interrupt request, also negates the interrupt taken/not taken indicator to indicate that the interrupt was not accepted by the processor.

5. The data processing system of statement 1 or any other appropriate statement herein, wherein the interrupt controller for example (14), upon receiving the interrupt request from an interrupt source, assigns a priority to the interrupt request, assigns the interrupt vector to the interrupt request, and sets a state of the interrupt request to pending, and wherein the interrupt controller provides the interrupt request, the interrupt identifier, and the interrupt vector to the processor when the interrupt request is a top priority interrupt request as compared to other pending interrupt requests for the processor.

6. The data processing system of statement 5 or any other appropriate statement herein, wherein when the interrupt request is the top priority interrupt, the interrupt controller generates the interrupt identifier, and stores the interrupt identifier in an outstanding interrupt queue for example (78).

7. The data processing system of statement 6 or any other appropriate statement herein, wherein when the interrupt request is the top priority interrupt request, the interrupt controller also stores a source identifier corresponding to the interrupt source in the outstanding interrupt queue.

8. The data processing system of statement 6 or any other appropriate statement herein, wherein the interrupt controller, upon receiving the interrupt acknowledge and the interrupt identifier from the processor, uses the interrupt identifier to locate a matching entry within the outstanding interrupt request queue which matches the interrupt identifier.

9. The data processing system of statement 8 or any other appropriate statement herein, wherein the interrupt controller, upon receiving the interrupt acknowledge and the interrupt identifier from the processor, provides a state update indicator for example (82) to change the state of the interrupt request from pending to in-service.

10. The data processing system of statement 1 or any other appropriate statement herein, wherein the interrupt controller operates according to a first clock for example (54) and the processor operates according to a second clock for example (52) wherein the first clock has an arbitrary phase and frequency relationship with the second clock.

11. A method within a data processing system having a processor, the method comprising:
providing to the processor an interrupt request for example (30), an interrupt identifier for example (31) corresponding to the interrupt request, and an interrupt vector for example (32) corresponding to the interrupt request; and
receiving from the processor, when the interrupt request is accepted by the processor, an interrupt acknowledge corresponding to the interrupt request and the interrupt identifier.

12. The method of statement 11 or any other appropriate statement herein, wherein prior to the providing to the processor, the method further comprises:
receiving the interrupt request from an interrupt source;
assigning a priority and the interrupt vector to the interrupt request;
setting a state of the interrupt request to pending; and
sorting the interrupt request among other pending interrupt requests for the processor to identify a top priority interrupt request, wherein the providing to the processor is performed when the interrupt request is identified as the top priority interrupt request.

13. The method of statement 12 or any other appropriate statement herein, further comprising:
when the interrupt request is identified as the top priority interrupt request for example (105), generating the interrupt identifier and storing for example (106) the interrupt identifier in a first entry of an outstanding interrupt queue for example (78).

14. The method of statement 13 or any other appropriate statement herein, further comprising:
when the interrupt request is identified as the top priority interrupt request, storing for example (106) a source identifier corresponding to the interrupt source in the first entry of the outstanding interrupt queue for example (78).

15. The method of statement 13 or any other appropriate statement herein, further comprising:
after the receiving from the processor the interrupt acknowledge and the interrupt identifier, using the interrupt identifier to locate a matching entry within the outstanding interrupt request queue which matches the interrupt identifier.

16. The method of statement 15 or any other appropriate statement herein, further comprising:
when the matching entry is located within the outstanding interrupt request queue, changing the state of the interrupt request from pending to in-service and removing the matching entry from the outstanding interrupt request queue.

17. The method of statement 11 or any other appropriate statement herein, further comprising:
receiving from the processor an interrupt taken/not taken indicator for example (35), wherein the processor asserts the interrupt taken/not taken indicator to indicate that the interrupt request was accepted by the processor and the processor negates the interrupt taken/not taken indicator to indicate that the interrupt request was not accepted by the processor.

18 A method within a data processing system having a processor, the method comprising:
receiving a first interrupt request for example (30) from a first interrupt source;
setting a state of the first interrupt request to pending;
generating a first interrupt request identifier for example (31) corresponding to the first interrupt request;
storing the first interrupt request identifier in an outstanding interrupt request queue for example (78);
providing to a processor for example (20) the first interrupt request, the first interrupt identifier, and a first interrupt vector for example (32) corresponding to the first interrupt request; and
receiving from the processor, when the first interrupt request is accepted by the processor, a first interrupt acknowledge corresponding to the first interrupt request and the first interrupt identifier.

19. The method of statement 18 or any other appropriate statement herein, further comprising:
after the receiving from the processor the first interrupt acknowledge and the first interrupt identifier, using the first interrupt identifier to locate a matching entry within the outstanding interrupt request queue which matches the interrupt identifier; and when the matching entry is located within the outstanding interrupt request queue, changing the state of the first interrupt request from pending to in-service.

20. The method of statement 18 or any other appropriate statement herein, wherein prior to the receiving from the processor, the method further comprises:
   receiving a second interrupt request from a second interrupt source;
   setting a state of the second interrupt request to pending; and
   when the second interrupt request has a higher priority than the first interrupt request, the method further comprises:
      generating a second interrupt request identifier corresponding to the second interrupt request;
      storing the second interrupt request identifier in the outstanding interrupt request queue; and
      providing to the processor the second interrupt request, the second interrupt identifier, and a second interrupt vector corresponding to the second interrupt request.

What is claimed is:

1. A data processing system comprising:
   a processor; and
   an interrupt controller coupled to the processor, wherein the interrupt controller receives an interrupt request from an interrupt source, assigns a priority to the interrupt request, assigns a priority to the interrupt request, assigns an interrupt vector to the interrupt request, sets a state of the interrupt request to pending, and provides the interrupt request, the interrupt identifier corresponding to the interrupt request, and the interrupt vector corresponding to the interrupt request to the processor when the interrupt request is a to priority interrupt request as compared to other pending interrupt requests for the processor, and wherein the processor, upon accepting the interrupt request, provides to the interrupt controller an interrupt acknowledge corresponding to the interrupt request and the interrupt identifier corresponding to the interrupt request.

2. The data processing system of claim 1, wherein the interrupt controller is coupled to the processor via an asynchronous interface, and wherein the interrupt request, interrupt identifier, interrupt vector, and interrupt acknowledge are provided via the asynchronous interface.

3. The data processing system of claim 1, wherein the processor, upon accepting the interrupt request, also asserts an interrupt taken/not taken indicator to indicate that the interrupt request was accepted by the processor, wherein the interrupt taken/not taken indicator is provided from the processor to the interrupt controller.

4. The data processing system of claim 1, wherein when the interrupt request is the top priority interrupt, the interrupt controller generates the interrupt identifier, and stores the interrupt identifier in an outstanding interrupt queue.

5. The data processing system of claim 1, wherein the interrupt controller operates according to a first clock and the processor operates according to a second clock wherein the first clock has an arbitrary phase and frequency relationship with the second clock.

6. The data processing system of claim 3, wherein the processor, upon not accepting the interrupt request, also negates the interrupt taken/not taken indicator to indicate that the interrupt was not accepted by the processor.

7. The data processing system of claim 4, wherein when the interrupt request is the top priority interrupt request, the interrupt controller also stores a source identifier corresponding to the interrupt source in the outstanding interrupt queue.

8. The data processing system of claim 4, wherein the interrupt controller, upon receiving the interrupt acknowledge and the interrupt identifier from the processor, uses the interrupt identifier to locate a matching entry within the outstanding interrupt request queue which matches the interrupt identifier.

9. The data processing system of claim 8, wherein the interrupt controller, upon receiving the interrupt acknowledge and the interrupt identifier from the processor, provides a state update indicator to change the state of the interrupt request from pending to in-service.

10. A method within a data processing system having a processor, the method comprising:
    providing to the processor an interrupt request, an interrupt identifier corresponding to the interrupt request, and an interrupt vector corresponding to the interrupt request;
    receiving from the processor, when the interrupt request is accepted by the processor, an interrupt acknowledge corresponding to the interrupt request and the interrupt identifier; and
    receiving from the processor an interrupt taken/not taken indicator, wherein the processor asserts the interrupt taken/not taken indicator to indicate that the interrupt request was accepted by the processor and the processor negates the interrupt taken/not taken indicator to indicate that the interrupt request was not accepted by the processor.

11. The method of claim 10, wherein prior to the providing to the processor, the method further comprises:
    receiving the interrupt request from an interrupt source;
    assigning a priority and the interrupt vector to the interrupt request;
    setting a state of the interrupt request to pending; and
    sorting the interrupt request among other pending interrupt requests for the processor to identify a top priority interrupt request, wherein the providing to the processor is performed when the interrupt request is identified as the top priority interrupt request.

12. The method of claim 11, further comprising:
    when the interrupt request is identified as the top priority interrupt request, generating the interrupt identifier and storing the interrupt identifier in a first entry of an outstanding interrupt queue.

13. The method of claim 12, further comprising:
    when the interrupt request is identified as the top priority interrupt request, storing a source identifier corresponding to the interrupt source in the first entry of the outstanding interrupt queue.

14. The method of claim 12, further comprising:
    after the receiving from the processor the interrupt acknowledge and the interrupt identifier, using the interrupt identifier to locate a matching entry within the outstanding interrupt request queue which matches the interrupt identifier.

15. The method of claim 14, further comprising:
    when the matching entry is located within the outstanding interrupt request queue, changing the state of the interrupt request from pending to in-service and removing the matching entry from the outstanding interrupt request queue.

16. A method within a data processing system having a processor, the method comprising:
    receiving a first interrupt request from a first interrupt source;
    setting a state of the first interrupt request to pending;
    generating a first interrupt request identifier corresponding to the first interrupt request;

storing the first interrupt request identifier in an outstanding interrupt request queue;

providing to a processor the first interrupt request, the first interrupt identifier, and a first interrupt vector corresponding to the first interrupt request; and receiving from the processor, when the first interrupt request is accepted by the processor, a first interrupt acknowledge corresponding to the first interrupt request and the first interrupt identifier.

17. The method of claim 16, further comprising:

after the receiving from the processor the first interrupt acknowledge and the first interrupt identifier, using the first interrupt identifier to locate a matching entry within the outstanding interrupt request queue which matches the interrupt identifier; and when the matching entry is located within the outstanding interrupt request queue, changing the state of the first interrupt request from pending to in-service.

18. The method of claim 16, wherein prior to the receiving from the processor, the method further comprises:

receiving a second interrupt request from a second interrupt source;

setting a state of the second interrupt request to pending; and when the second interrupt request has a higher priority than the first interrupt request, the method further comprises:

generating a second interrupt request identifier corresponding to the second interrupt request;

storing the second interrupt request identifier in the outstanding interrupt request queue; and providing to the processor the second interrupt request, the second interrupt identifier, and a second interrupt vector corresponding to the second interrupt request.

* * * * *

UNITED STATES PATENT AND TRADEMARK OFFICE
CERTIFICATE OF CORRECTION

PATENT NO. : 7,849,247 B2  
APPLICATION NO. : 12/250682  
DATED : December 7, 2010  
INVENTOR(S) : Bryan D. Marietta et al.

Page 1 of 1

It is certified that error appears in the above-identified patent and that said Letters Patent is hereby corrected as shown below:

Title page, item (54), and in the Specification, Column 1, lines 1-4; please change "INTERRUPT CONTROLLER FOR ACCELERATED INTERRUPT HANDLING IN A DATA PROCESSING SYSTEM AND METHOD THEREOF" to be --INTERRUPT CONTROLLER FOR ACCELERATED INTERRUPT HANDLING IN A DATA PROCESSING SYSTEM AND METHOD THEREFOR--

In the Claims:

Column 11, line 33, please change "a to priority" to be --a top priority--

Signed and Sealed this  
Twentieth Day of August, 2013

Teresa Stanek Rea  
*Acting Director of the United States Patent and Trademark Office*